United States Patent [19]

Donelson

[11] Patent Number: 5,020,701
[45] Date of Patent: Jun. 4, 1991

[54] GRAIN SPREADING DEVICE FOR GRAIN BINS

[76] Inventor: Harlan J. Donelson, 3705 Windmill La., Plano, Tex. 75074

[21] Appl. No.: 354,752

[22] Filed: May 22, 1989

[51] Int. Cl.[5] .............................................. B65D 5/72
[52] U.S. Cl. .................................. 222/494; 222/504; 239/687
[58] Field of Search ............... 222/516, 517, 518, 504, 222/494, 491; 239/681, 687, 688, 65; 414/301, 302

[56] References Cited

U.S. PATENT DOCUMENTS

| | | | |
|---|---|---|---|
| 396,251 | 1/1889 | Adamson | 239/688 |
| 3,045,840 | 7/1962 | Donelson, Jr. | 239/687 |
| 3,170,264 | 2/1965 | Waldrum | 239/687 |
| 3,698,574 | 10/1972 | Louks | 239/687 |
| 3,902,610 | 9/1975 | Sukup | 239/687 |

Primary Examiner—Robert P. Olszewski
Assistant Examiner—Kenneth Noland
Attorney, Agent, or Firm—Zarley, McKee, Thomte, Voorhees & Sease

[57] ABSTRACT

The grain spreading device of this invention comprises an inverted conically-shaped hopper having an open upper end and a smaller open lower end. A variable speed motor is mounted within the hopper, and has an output power shaft which extends downwardly through the open lower end thereof. An elongated sleeve embraces the lower end of the power shaft, and the sleeve is operatively connected to the power shaft by a series of vertically disposed cam members which embrace the shaft within the sleeve. A resilient spring is mounted within the lower end of the sleeve around the lower end of the shaft and supports the lower cam member to which the sleeve is attached. The upper cam member is rigidly secured to the shaft and rotational power is imparted to the sleeve from the shaft through the cam members. The vertical position of the sleeve with respect to the shaft is dictated by the spring. A horizontally disposed screen spreader plate is mounted to the top of the sleeve and is normally held adjacent the open lower end of the hopper when the hopper is free of grain. Wing plates are pivotally secured to the grain spreader plate, and grain deflector flanges are secured to the side edges thereof to impart thrust to the grain deposited thereon. Weights are adjustably secured to the wing plates to influence their attitude while being rotated.

20 Claims, 4 Drawing Sheets

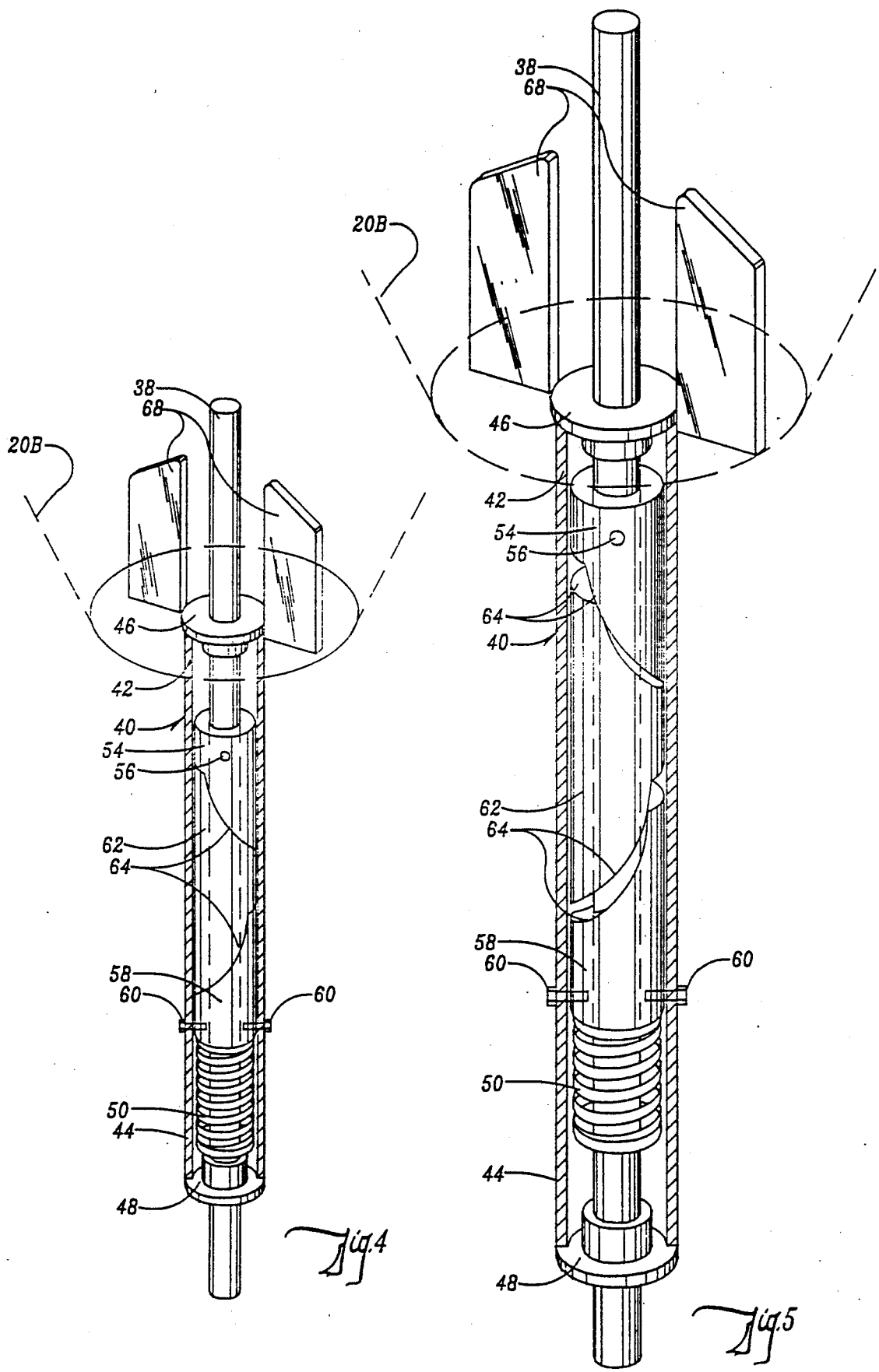

GRAIN SPREADING DEVICE FOR GRAIN BINS

SUMMARY OF THE INVENTION

Motorized grain spreading devices suitable for mounting at the apex of circular grain storage bins have long been in use. The purpose of these devices is to cause grain entering the storage bin through the grain spreading device to be uniformly distributed within the bin to maintain the grain deposited in the bin at a uniform level.

However, the prior grain spreading devices will not automatically turn themselves on or shut themselves off in response to a presence or absence of grain therein which means that the operator must continually monitor the situation and turn the power to the grain spreader on and off as required.

In addition, the prior grain spreaders are not responsive to metering the flow of grain there-through depending on the rate of flow of grain into the spreader unit. These devices also do not have the ability to vary their speed of rotation under different loading conditions.

It is therefore a principal object of this invention to provide a grain spreading device for storage bins which will start operation automatically when grain is deposited therein, and will cease operation when grain ceases to be deposited therein.

A further object of this invention is to provide a grain spreading device for grain storage bins which will automatically increase or decrease the discharge outlet thereof depending upon the rate of flow of grain therein.

A further object of this invention is to provide a grain spreading device for grain storage bins which will start operation automatically when grain is deposited therein, using a variable speed motor wherein the speed of rotation of the grain spreading mechanism can be controlled to in turn control the spread pattern of grain being discharged therefrom.

A further object of this invention is to provide a grain spreading device for grain storage bins which is economical to manufacture, durable in use, and refined in appearance.

These and other objects will be apparent to those skilled in the art.

BRIEF SUMMARY OF THE INVENTION

The grain spreading device of this invention comprises an inverted conically-shaped hopper having an open upper end and a smaller open lower end. A variable speed motor is mounted within the hopper, and has an output power shaft which extends downwardly through the open lower end thereof. An elongated sleeve embraces the lower end of the power shaft, and the sleeve is operatively connected to the power shaft by a series of vertically disposed cam members which embrace the shaft within the sleeve.

A resilient spring is mounted within the lower end of the sleeve around the lower end of the shaft and supports the lower cam member to which the sleeve is attached. The upper cam member is rigidly secured to the shaft and rotational power is imparted to the sleeve from the shaft through the cam members. The vertical position of the sleeve with respect to the shaft is dictated by the spring.

A horizontally disposed grain spreader plate is mounted to the top of the sleeve and is normally held adjacent the open lower end of the hopper when the hopper is free of grain. Wing plates are pivotally secured to the grain spreader plate, and grain deflector flanges are secured to the side edges thereof to impart thrust to the grain deposited thereon. Weights are adjustably secured to the wing plates to influence their attitude while being rotated.

A BRIEF DESCRIPTION OF THE DRAWINGS

FIG. 4 is a perspective view of the power shaft and sleeve assembly of the device of this invention with portions thereof broken away to more fully illustrate its construction;

FIG. 5 is a view similar to that of FIG. 4 shown in enlarged scale with the cam elements thereof shown in a separated condition;

DESCRIPTION OF THE PREFERRED EMBODIMENT

Figure 1:
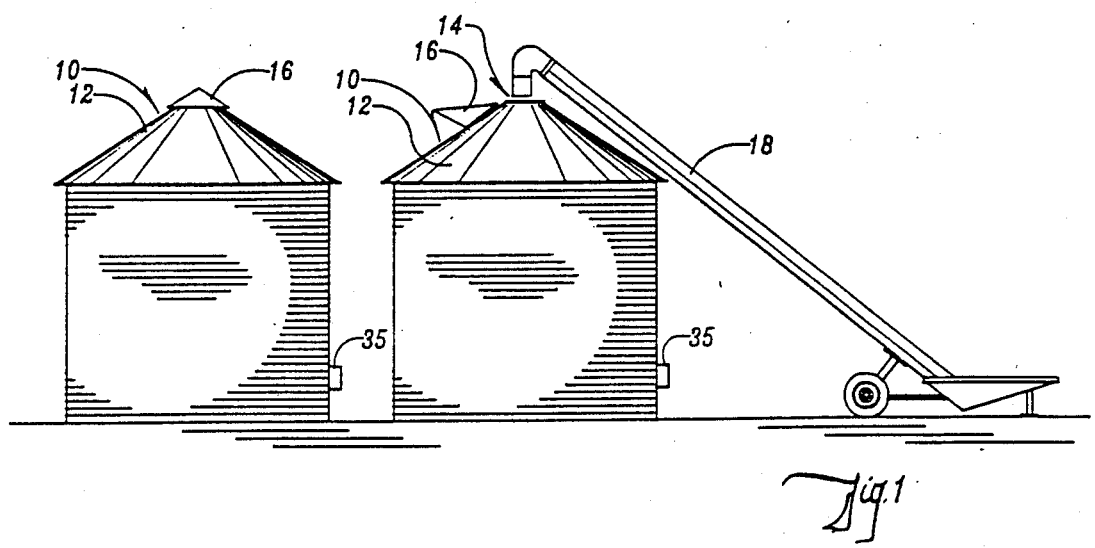
FIG. 1 is an elevational view of typical grain storage bins and a conventional grain conveyor for depositing grain in the bins.

With reference to FIG. 1, conventional cylindrical grain bins 10 have a tapered roof 12 with a center opening 14 at the apex of the roof. Conventional hinged cover 16 is adapted to close the center opening 14. A conventional grain conveyor for carrying grain from ground level to the center opening 14 of the bins 10 is shown by the numeral 18.

Figure 2:
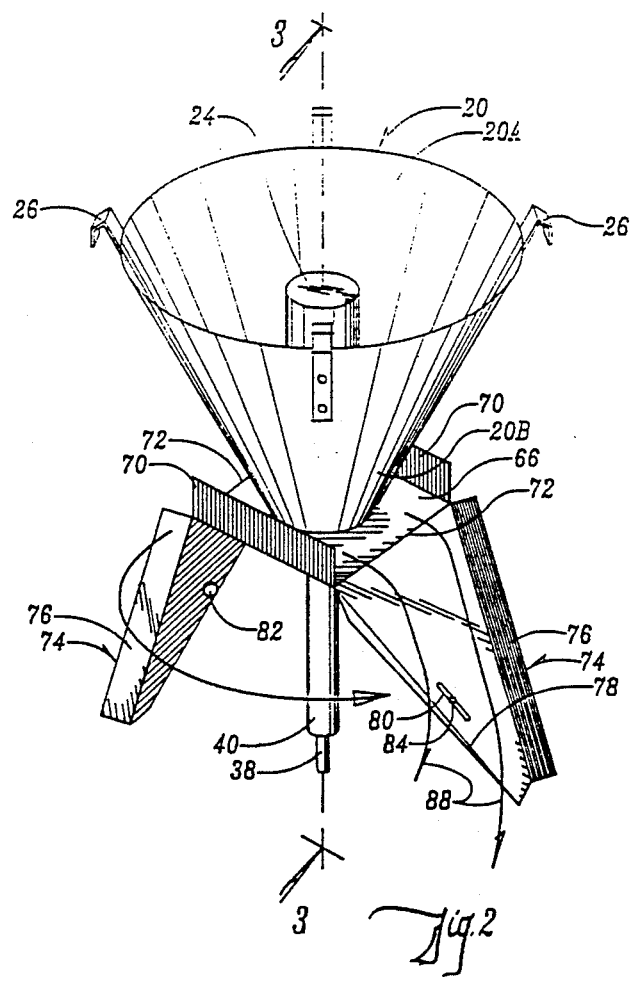
FIG. 2 is an enlarged scale perspective view of the device of this invention.
Figure 3:
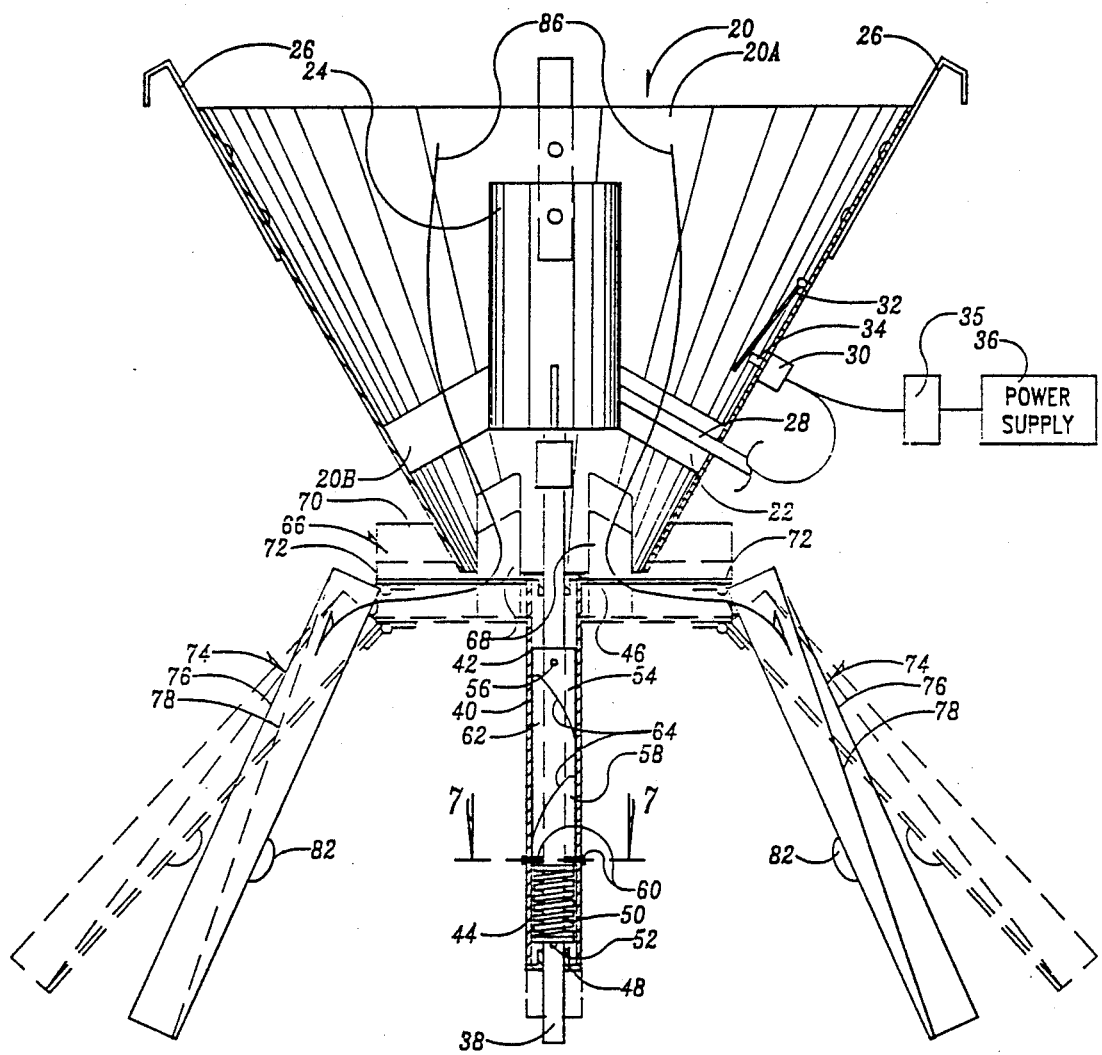
FIG. 3 is an enlarged scale sectional view taken on line 3—3 of FIG. 2.

With reference to FIGS. 2 and 3, an inverted conically shaped hopper 20 has an upper open end 20A and a smaller lower open end 20B. Brackets 22 extend inwardly and upwardly from the sidewalls of the hopper and support electric motor 24. Motor 24 should preferably be of the brush type and should have variable speed capability. Brackets 26 at the upper periphery of the hopper are adapted to engage the roof 12 at the periphery of center opening 14 to hold the hopper in operative position within the opening 14.

A power conduit 28 extends from motor 24 to a source of electrical power. The power conduit is operatively connected to normally open switch 30 on the side of hopper 20. A hinged lever 32 is pivotally mounted within the hopper and covers plunger 34 of switch 30 so that the weight of grain within the hopper will cause the lever to depress plunger 34 to cause motor 24 to commence operating. A master switch 35, which can be located on the sidewall of bins 10, is interposed between the motor and power supply 36.

Motor 24 has a power shaft 38 extending downwardly therefrom through the lower open end 20B of hopper 20. A tubular sleeve 40 embraces power shaft 38. Sleeve 40 has an upper end 42 and a lower end 44. An upper bearing 46 embraces power shaft 38 and is secured within the upper end of sleeve 40. Similarly, a lower bearing 48 is imposed within the lower end of sleeve 44 and also embraces power shaft 38. Both bearings 46 and 48 are capable of vertical movement on the shaft 38.

A spring 50 is mounted within sleeve 40 at the lower end thereof and is held in position with respect to shaft 38 by pin 52 (FIG. 3). With reference to FIG. 5, an upper cam member 54 is secured to shaft 38 by pin 56. A lower cam member 58 is slidably mounted on the lower end of shaft 38 and rests on the upper end of spring 50. Cam member 58 is rigidly secured to sleeve 40 by means of screws 60. A center cam 62 is slidably mounted on shaft 38 in between the cam members 54 and 58. Each of the three cam members 54, 58 and 62 have spiral cam surfaces 64 which are complimentary in shape. When the hopper 20 is void of grain, the spring 50 causes sleeve 40 and lower cam member 58 to move upwardly into engagement with the center cam member 62, which in turn moves upwardly with engagement with the upper cam member 54 (FIG. 4).

A grain spreader table 66 is secured to the upper end of sleeve 40 and is disposed in a horizontal position. Grain agitating plates 68 (FIG. 3) are secured to the upper surface of table 66 and extend upwardly through the open lower end 20B of hopper 20 and penetrate the space within the lower end of the hopper.

Grain spreader table 66 has vertically disposed sidewall 70 (FIG. 2) and side edges 72. Wing plates 74 are pivotally secured to side edges 72. A deflector flange 76 on each of the wing plates 74 is vertically disposed with respect to the plates, and a deflector flange 78 on each of the wing plates is disposed on the opposite side of the wing plates with respect to flange 76. Deflector flange 78 is disposed at an obtuse angle with respect to the plate.

Figure 6:
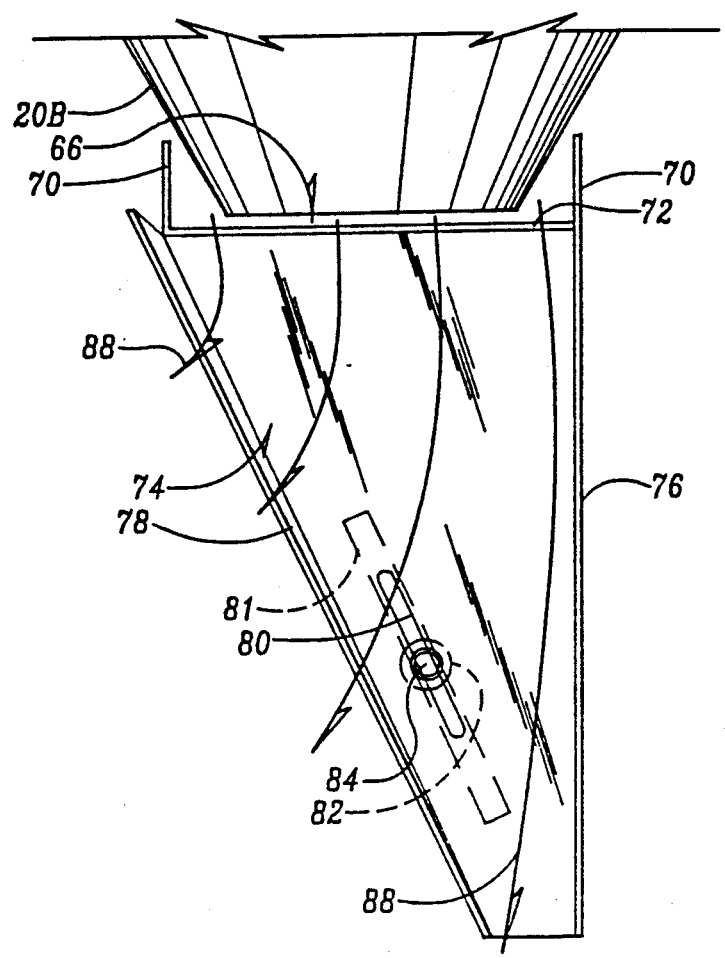
FIG. 6 is a partial elevational view of the lower portion of the hopper and one of the wing plates.
Figure 7:
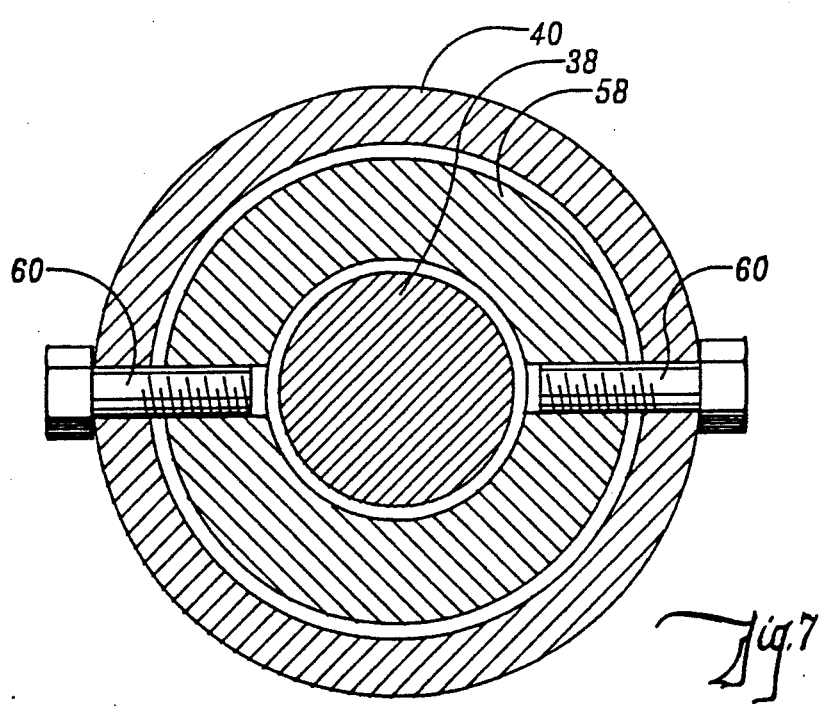
FIG. 7 is a sectional view of an enlarged scale taken on line 7—7 of FIG. 3.

Each of the plates 74 have an elongated slot 80 with a weight 82 secured to the bottom side thereof through the slots by means of bolt and nut assembly 84. Cover plate 81 is held in place by assembly 84 and prevents grain from passing through slot 80. (FIG. 6)

The upper cam member 54 and the lower cam member 58 are preferably comprised of metal, with the center cam member 62 being comprised of a hard plastic material.

Master switch 35 can include a rheostat or the like whereby the amount of power to motor 24 can be varied to control the speed thereof.

In operation, the master switch 35 is closed, and the normally open switch 30 causes the motor 24 to remain dormant. When grain is conveyed to hopper 20 by means of conveyor 18, the initial grain deposit in the hopper does not flow through the open bottom end thereof because the spring 50 holds the grain spreader table 66 in a position closely adjacent the lower end of the hopper as shown by the solid lines in FIG. 3. When the level of grain reaches the level of the lever 32 on switch 30, the motor 24 is actuated and the power shaft commences to rotate. This causes the rotation of sleeve 40 and grain spreader table 66. The centrifugal force of the rotation of table 66 causes wing plates 74 to move from the solid position shown in FIG. 3 to an upper and outer position shown by the dotted lines in the that figure. The weights 82 on the wing plates 74 have normally been preadjusted to a position which will limit the upper pivotal movement of the wing plates. As a result, the weights 82 can permit the device of this invention to accommodate bins of varying diameters.

When the level of grain in hopper 20 reaches the level of the lever 32 of switch 30, the accumulated weight of the grain exerted on the grain spreader table 66 can cause compression of spring 50. This weight factor, coupled with the action of the cam members to be described hereafter, causes the grain table 66 to move downwardly from the lower end of the hopper 20 as depicted by the dotted lines in FIG. 3.

As shaft 38 commences to rotate, cam member 54 through its cam surfaces 64, "screws" the center cam member 62 in a downwardly direction. This is best shown in FIG. 5. While cam member 62 moves downwardly with respect to the fixed cam member 54, the cam surfaces 64 of the two members do not completely separate and remain in operative rotational engagement.

In like manner, cam member 62 "screws" cam member 58 in a downwardly direction, and this further causes the compression of spring 50 and causes sleeve 40 to move downwardly with respect to shaft 38. This causes the grain table 66 on the top of the sleeve 40 to move downwardly towards the position of the dotted lines shown in FIG. 3, and this enlarges the effective discharge opening between the lower end 20B of hopper 20 and the upper surface of the grain spreader table 66. The arrows 86 in FIG. 3 show the path of grain through the hopper 20, onto the grain spreader table 66, and thence onto the wing plates 74. The arrows 88 in FIGS. 2 and 6 show the path of the grain from the grain table onto and thence off of the wing plates 74.

When the conveyor 18 ceases to deposit grain within hopper 20, the spring 50 expands and moves the cam elements 54, 58 and 62 from the configuration shown in FIG. 5 to the configuration shown in FIG. 4. This causes the grain spreader table 66 and the sleeve 40 to assume the position shown by the solid lines in FIG. 3. When the grain in hopper 20 falls to a level below that of level 32, switch 30 then moves to an open position and electrical power to motor 24 is thereupon terminated and the device ceases to operate.

It is therefore seen that the device of this invention is essentially fully automatic and is completely responsive to variations in grain flow being deposited within the hopper 20. The device of this invention is therefore see to achieve at least all of its stated objectives.

What is claimed is:

1. A grain spreading device adapted to uniformly distribute grain deposited therein within a grain bin in which the grain spreading device is mounted, comprising:
   an inverted conically-shaped hopper, having an open upper end and a smaller open end;
   a motor mounted on said hopper;
   an output power shaft operatively secured to said motor and extending downwardly through said open lower end;
   a horizontally disposed grain spreading table operatively secured to said power shaft and being normally disposed closely adjacent said lower end;
   resilient means interconnecting said grain spreading table and said power shaft whereupon said grain spreading table will move downwardly with respect to said shaft to create a grain discharge opening at said lower end of said hopper when said hopper contains sufficient grain to cause said resilient means to compress;
   said grain spreading table being secured to an elongated sleeve that slidably embraces said power shaft and is operatively connected to said resilient means; and
   a first cam element secured to said power shaft within said sleeve, a second cam element slidably mounted on said power shaft below said first stop element and engaging said resilient means, a third cam element slidably mounted on said power shaft and operatively engaging said first and second cam elements, said second cam element being secured to said sleeve, whereby rotational power imparted to said power shaft by said motor will be transmitted to said sleeve and said grain spreading table through said cam elements.

2. The device of claim 1 wherein said resilient means includes a spring.

3. The device of claim 1 wherein said resilient means includes a spring within said sleeve.

4. The device of claim 1 whereby said resilient means will hold said grain spreading table closely adjacent said open lower end of said hopper when said hopper is empty.

5. The device of claim 1 wherein said cam elements have coacting cam surfaces which remain in at least partial operating engagement regardless of the relative vertical positions of said cam elements.

6. The device of claim 5 wherein said cam surfaces are spirally shaped.

7. The device of claim 1 wherein a pressure switch is mounted within said hopper to actuate said motor when grain in said hopper exerts pressure thereon.

8. The device of claim 1 wherein grain agitating plates are secured to said grain spreading table and extend upwardly into the lower open end of said table.

9. A grain spreading device adapted to uniformly distribute grain deposited therein within a grain bin in which the grain spreading device is mounted, comprising:
- an inverted conically-shaped hopper, having an open upper end and a smaller open end;
- a motor mounted on said hopper;
- an output power shaft operatively secured to said motor and extending downwardly through said open lower end;
- a horizontally disposed grain spreading table operatively secured to said power shaft and being normally disposed closely adjacent said lower end;
- resilient means interconnecting said grain spreading table and said power shaft whereupon said grain spreading table will move downwardly with respect to said shaft to create a grain discharge opening at said lower end of said hopper when said hopper contains sufficient grain to cause said resilient means to compress;
- wing plates hingedly secured to said grain spreading table; and
- weights adjustably secured to said wing plates.

10. The device of claim 9 wherein deflector flanges are mounted on said wing plates.

11. The device of claim 9 wherein said resilient means include a spring.

12. The device of claim 9 wherein said resilient means includes a spring within said sleeve.

13. The device of claim 9 wherein a pressure switch is mounted within said hopper to actuate said motor when grain in said hopper exerts pressure thereon.

14. The device of claim 9 wherein grain agitating plates are secured to said grain spreading table and extend upwardly into the lower open end of said table.

15. A grain spreading device adapted to uniformly distribute grain deposited therein within a grain bin in which the grain spreading device is mounted, comprising:
- a hopper having open upper and lower ends;
- a motor mounted on said hopper;
- a rotatable output power shaft operatively secured to said motor and extending downwardly through said open lower end;
- a horizontally disposed grain spreading table operatively connected to said shaft for rotation therewith, said table being movable along said shaft between a lower open position and a raised closed position;
- resilient means interconnecting said table and said shaft to normally urge said shaft to the closed position when said hopper is empty, said table moving downwardly to the open position when said hopper contains sufficient grain to compress said resilient means;
- said resilient means including a spring; and
- a first cam element secured to said power shaft within said sleeve, a second cam element slidably mounted on said power shaft below said first stop element and engaging said resilient means, a third cam element slidably mounted on said power shaft and operatively engaging said first and second cam elements, said second cam element being secured to said sleeve, whereby rotational power imparted to said power shaft by said motor will be transmitted to said sleeve and said grain spreading table through said cam elements.

16. The device of claim 15 wherein a pressure switch is mounted within said hopper to actuate said motor when grain in said hopper exerts pressure thereon.

17. The device of claim 15 wherein grain agitating plates are secured to said grain spreading table and extend upwardly into the lower open end of said table.

18. A grain spreading device adapted to uniformly distribute grain deposited therein within a grain bin in which the grain spreading device is mounted, comprising:
- a hopper having open upper and lower ends;
- a motor mounted on said hopper;
- a rotatable output power shaft operatively secured to said motor and extending downwardly though said open lower end;
- a horizontally disposed grain spreading table operatively connected to said shaft for rotation therewith, said table being movable along said shaft between a lower open position and a raised closed position;
- resilient means interconnecting said table and said shaft to normally urge said shaft to the closed position when said hopper is empty, said table moving downwardly to the open position when said hopper contains sufficient grain to compress said resilient means.

19. The device of claim 18 wherein a pressure switch is mounted within said hopper to actuate said motor when grain in said hopper exerts pressure thereon.

20. The device of claim 18 wherein grain agitating plates are secured to said grain spreading table and extend upwardly into the lower open end of said table.

* * * * *